United States Patent
Raab

[11] 4,054,881
[45] Oct. 18, 1977

[54] REMOTE OBJECT POSITION LOCATER

[75] Inventor: Frederick H. Raab, Burlington, Vt.

[73] Assignee: The Austin Company, Cleveland, Ohio

[21] Appl. No.: 680,471

[22] Filed: Apr. 26, 1976

[51] Int. Cl.² .............................................. G01S 3/02
[52] U.S. Cl. ............................ 343/112 R; 324/34 PS
[58] Field of Search ................. 343/112 R, 112 D; 324/34 R, 34 PS, 34 D, 4, 8; 340/38 L

[56] References Cited

U.S. PATENT DOCUMENTS

| | | | |
|---|---|---|---|
| 3,121,228 | 2/1964 | Kalmus | 343/112 D |
| 3,430,243 | 2/1969 | Evans | 343/112 D |
| 3,868,565 | 2/1975 | Kuipers | 343/100 CS |

Primary Examiner—Maynard R. Wilbur
Assistant Examiner—T. M. Blum
Attorney, Agent, or Firm—Price, Heneveld, Huizenga & Cooper

[57] ABSTRACT

Three mutually orthogonal radiating antennas each transmit electromagnetic radiation to three mutually orthogonal receiving antennas. The transmitted electromagnetic radiation carries data characterizing the phase of the electromagnetic radiation. Measurement of the three transmitted signals as received by the set of three orthogonal receiving antennas produces nine parameters which, in combination with one known position or orientation parameter, are sufficient to determine the position and orientation parameters of the receiving antennas with respect to the position and orientation of the radiating antennas.

22 Claims, 11 Drawing Figures

NEAR-FIELD AND FAR FIELD

LOCATION COORDINATES

BASIC FIELD PATTERN

ORIENTATION COORDINATES

SIGNAL FORMAT

REMOTE OBJECT POSITION LOCATER

BACKGROUND OF THE INVENTION

1. Field of the Invention.

This invention relates to determining the position of a remote object with respect to a reference point; and, more particularly, to radiating an electromagnetic field from the reference point, detecting the field at the remote object and analyzing the detected field to determine the position of the remote object.

2. Description of the Prior Art

The use of orthogonal coils for generating and sensing magnetic fields is well known. Such apparatus has received wide attention in the area of mapping magnetic fields to provide a better understanding of their characteristics, for example. If a magnetic field around generating coils can be very accurately mapped through use of sensing coils, it has also been perceived that it might be possible to determine the location of the sensing coils relative to the generating coils based on what is sensed. However, a problem associated with doing this is that there is more than one location and/or orientation within a usual magnetic dipole field that will provide the same characteristic sensing signals in a sensing coil. In order to use a magnetic field for this purpose, additional information must therefore be provided.

One approach to provide the additional information required for this purpose is to have the generating and sensing coils move with respect to each other, such as is taught in U.S. Pat. No. 3,644,825. The motion of the coils generates changes in the magnetic field, and the resulting signals then may be used to determine direction of the movement or the relative position of the generating and and sensing coils. While such an approach removes some ambiguity about the position on the basis of the field sensed, its accuracy is dependent on the relative motion, and it cannot be used at all without the relative motion.

Another approach that has been suggested to provide the additional required information is to make the magnetic field rotate as taught in Kalmus, "A New Guiding and Tracking System," IRE Transactions on Aerospace and Navigational Electronics, March 1962, pages 7–10. To determine the distance between a generating and a sensing coil accurately, that approach requires that the relative orientation of the coils be maintained constant. It therefore cannot be used to determine both the relative translation and relative orientation of the generating and sensing coils.

U.S. Pat. No. 3,868,565 teaches a tracking system for continuously determining at the origin of a reference coordinate system the relative translation and orientation of a remote object. The tracking system includes radiating and sensing antenna arrays each having three orthogonally positioned loops. Properly controlled excitation of the radiating antenna array allows the instantaneous composite radiated electromagnetic field to be equivalent to that of a single loop antenna oriented in any desired direction. Further control of the excitation causes the radiated field to nutate about an axis denoted a pointing vector.

The tracking system is operated as a closed loop system with a computer controlling the radiated field orientation and interpreting the measurements made at the sensing antenna array. That is, an information feedback loop from the sensing antenna array to the radiating antenna array provides information for pointing the axis of the nutating field toward the sensing antenna array. Accordingly, the pointing vector gives the direction to the sensing antenna array from the radiating antenna array. The proper orientation of the pointing vector is necessary for computation of the orientation of the remote object. The signals detected at the sensing antenna include a nutation component. The nutating field produces a different nutation component in each of the three detected signals. The orientation of the sensing antenna array relative to the radiated signal is determined from the magnitudes of these components.

While the art of determining position and orientation of remote objects is a well developed one, there still remains a need to determine the relative position of a remote object with respect to a reference coordinate frame without imposing movement and orientation constraints on the remote object or the radiated electromagnetic field. Further, there is a need for continuously and simultaneously determining at a plurality of remote objects the relative positions of the remote objects with respect to a reference coordinate frame.

SUMMARY OF THE INVENTION

Accordingly, in accordance with an embodiment of this invention, three orthogonal electromagnetic field receiving means located at a remote object are used to sense three distinct electromagnetic fields radiated by three orthogonal transmitting means located at a reference coordinate frame. The electromagnetic fields radiated by the transmitting means contain information characterizing the phase of the radiated electromagnetic fields. If the remote object is restricted in one position or orientation parameter, measurement of the three electromagnetic fields transmitted by the three transmitting means as received by the set of three orthogonal receiving means produces parameters which are sufficient to determine the position parameters of the remote object relative to the reference frame. The separation distance of the remote object from the transmitting means is limited to the near field condition and determined by comparing the magnetic moment, or strength, of the transmitted electromagnetic field to the magnetic moment or strength of the electromagnetic field which is received by the three orthogonal receiving means. Although described above with respect to three dimensions, apparatus in accordance with an embodiment of this invention, for determining position coordinates of a remote object constrained to move in a plane, relative to a reference coordinate frame can comprise two radiating means having orthogonal components and two receiving means having orthogonal components.

An embodiment of this invention can also include determination of the orientation of the remote object with respect to the orientation of the reference coordinate frame by additional processing of the received parameters. Three receiving antennas detecting the three radiated electromagnetic fields produce nine parameters which are sufficient to determine the six positions and orientation parameters of the remote object relative to the reference frame. However, unless one orientation or position parameter is specified, there is an unresolvable ambiguity in position/orientation and that is the mirror image of the remote object through the origin of the reference frame. Nevertheless, this invention is particularly suited for determining the position and orientation of an airplane with respect to a landing site. A suitable parameter to specify is that the airplane is flying right side up or upside down. This invention is further suited for determining the position and orientation of a miner with respect to the surface and the position and orientation of a diver with respect to a boat. A suitable parameter to specify in the latter two cases is that the remote object is below the origin of reference frame. Accordingly, from a practical viewpoint the ambiguity is of no practical importance.

DETAILED DESCRIPTION OF THE INVENTION

Although the invention can be used in a plurality of embodiments, only an embodiment relating to a vertical take-off and landing aircraft landing system will be described in detail. However, it should be recognized that the invention is not limited to this embodiment and that it may be advantageous to vary specific parameters when this invention is used in another embodiment.

Figure 1:
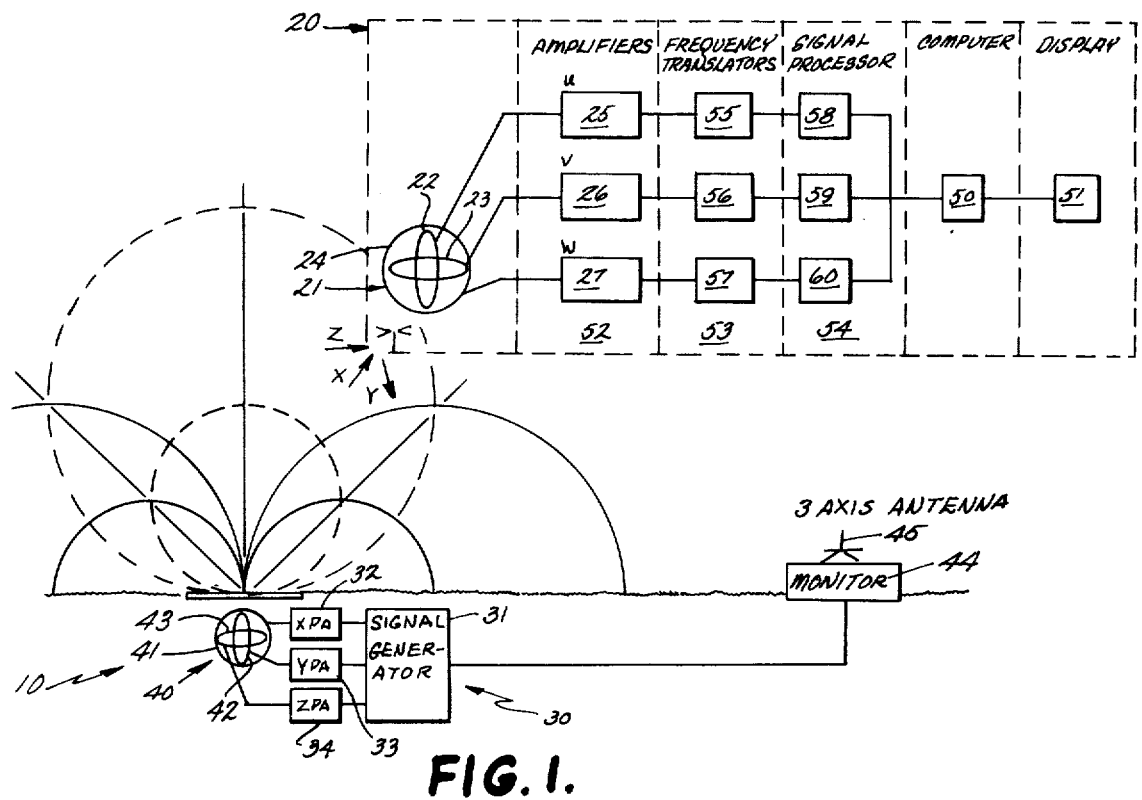
FIG. 1 is a partly block, side elevational view of a landing aid system in accordance with an embodiment of this invention.

Referring to FIG. 1, a landing aid system 10 includes ground based components 30 for radiating an electromagnetic field and airborne components 20 for receiving the electromagnetic field and determining the position and orientation of airborne components 20 with respect to ground based components 30. Ground based components include a signal generator 31 coupled in parallel to power amplifiers 32, 33, and 34. A ground antenna array 40 includes orthogonal loop antennas 41, 42, and 43 (denoted X, Y, Z) coupled to power amplifiers 32, 33, and 34, respectively. A monitor receiver 44 is coupled to signal generator 31, spaced from ground antenna array 40 and has an orthogonal antenna array 45 for receiving electromagnetic radiation from ground antenna array 40. Monitor receiver 44 provides a means of verifying the electromagnetic transmission from ground antenna array 40. Airborne components 20 include the sequential coupling of an orthogonal receiving antenna array 21 signal amplifer group 52, frequency translator group 53, signal processor group 59, computer 50 and display 51. More specifically, antenna array 21 includes receiving loop antennas 22, 23 and 24 (denoted U, V, W) coupled sequentially to signal amplifiers 25, 26 and 27, respectively, frequency translators 55, 56 and 57, respectively, and signal processors 58, 59 and 60 respectively.

Landing aid system 10 operates "open loop" in that the only communication between airborne components 20 and ground based components 30 is the radiated electromagnetic field from ground based components 30. There need be no communication from airborne components 20 to ground based components 30 in order to establish the position and orientation of receiving antenna array 21 with respect to ground antenna array 40. Further, landing aid system 10 allows simultaneous use by any number of remote users. In addition to providing the capability for measuring position and orientation, the signals radiated by ground antenna array 40 can provide a one-way data link from ground based components 30 to receiving antenna array 21. The link can carry information such as transmitter identification, field strength, field distortion corrections, locations of nearby obstacles, the location of the landing site relative to ground antenna array 40 and wind direction.

Figure 2:
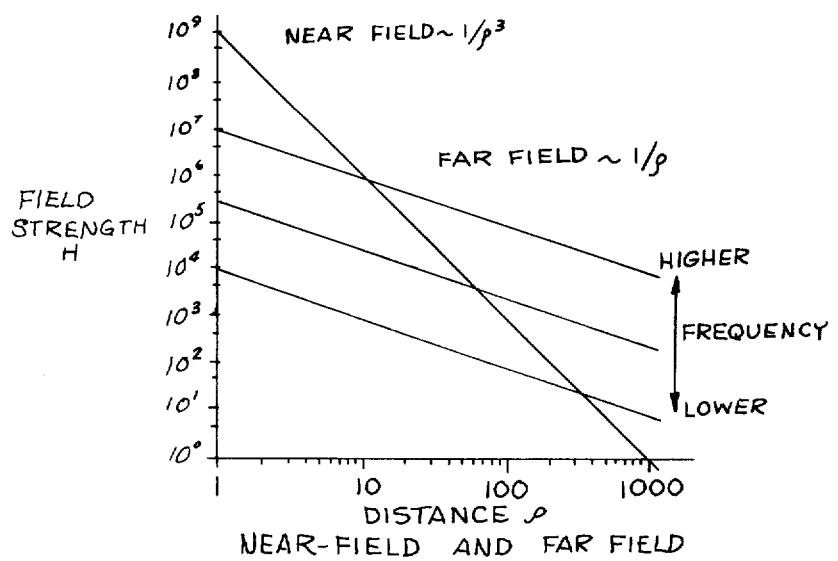
FIG. 2 is a graphical representation showing the relationship between magnetic field strength and distance from a radiator.

Referring to FIG. 2, the field produced by excitation of a loop antenna can be separated into two components called the near-field and the far-field and, in accordance with an embodiment of this invention, the separation distance of the remote object from the transmitting means is limited to the near-field condition. The far-field component decreases with distance from the antenna. Its intensity depends on the relative size of the antenna and the wave length of the excitation frequency, and it is this component which is used for long distance communications and navigation. The near-field decreases with the cube of the distance from the antenna which prevents its detection at large distances. The intensity of the near-field is not a function of frequency and it can be quite high at short distances. Advantageously, the near-field can be of low frequencies which have the ability to penetrate many materials and objects such as soil, trees and water much more easily than do high frequencies. In free space, low frequency electromagnetic fields conform to theoretical predictions based on a simple magnetic dipole. However, some field distortion does occur because of surrounding objects. The amount of distortion resulting from surrounding objects depends on the conductivity and permeability of these objects and their size and location relative to the receiving and transmitting antennas. It is possible to predict and compensate the distortion caused by nearby fixed objects and hence essentially remove position and orientation errors caused by these objects.

Ground based components 30 generate a near-field landing aid signal. Signal generator 31 generates the electrical signals to excite each of antennas 41, 42 and 43. The signal must be multiplexed so receiving antenna array 21 can distinguish the electromagnetic radiation from each of the antennas 41, 42 and 43. Additionally, the electrical signal must contain information characterizing the phase of the electromagnetic radiation. A simple example would be to include a timing pulse whenever the signal goes positive. Alternatively, if frequency multiplexing is used, the excitation to each of antennas 41, 42 and 43 is advantageously coherent. That is, periodically all of the signals are going positive simultaneously (see FIG. 6). Additionally, the data frequency determines the spacing between the carrier frequencies, and is thus the basic reference frequency of signal generator 31. The data frequency is labeled $f$ in FIG. 6. Advantageously, the reference frequency will be derived from a temperature compensated crystal oscillator in the 5MHz range and frequency selection will be in 10Hz step.

The set of three power amplifiers 32, 33 and 34 boosts the outputs of signal generator 31 to a level sufficient to produce the desired magnetic moment with the given antenna. To make efficient use of the power available, a switching power amplifier may be used. For example, either class D (carrier frequency switching) or class S (high frequency switching) amplification can be used. An RFI filter is advantageously also included.

Ground antenna array 40 includes mutually orthogonal loop antennas 41, 42 and 43 and may be buried in the landing pad or located on the surface nearby. The relationship of the landing pad to ground antenna array 40 can be included in the one-way data stream to airborne components 20. Antenna design involves trade-offs among number of turns, current and size, as well as the related parameters of input impedance, weight, and driving power. The far-field signal produced and the radiation resistance are negligible and all power required is dissipated in the wire resistance.

In an example of an embodiment of this invention, loop antennas 41, 42 and 43 each produce a magnetic moment of 400 $A.m^2$, a typical radius of the loop antenna is one meter and a typical ampere turns (NI) magnitude is 800. Since there are an infinite number of combinations of amperes and turns which will produce 800 ampere-turns, the choice of N and I can be used to select a convenient input resistance and weight. This selection can be made using standard wire tables, or by using density and resistivity information. A practical, general purpose design thus determined is to use 20 turns with a driving current of 40 amperes (peak). The use of #6 aluminum wire will produce a resistance of about 0.25 ohms resulting in a power dissipation of about 198 Watts. The reactance due to a 0.5 $\mu H$ inductance can be neutralized by a series capacitor. A single loop will weigh 4.5 kg, and the array of three antennas will thus weigh 13.5 kg, neglecting the supporting structure.

Of course, other configurations can be made for other particular applications. For example, in a fixed, permanent installation, it would be preferable to increase the weight of the array to, for example, 135 kg, thus reducing the resistance and hence power requirement to about 20 Watts per antenna or about 60 Watts total.

Monitor receiver 44 is similar to an airborne receiver, but omits position/orientation computations, data decoding, and display. Its function is to make sure that electromagnetic field amplitudes and phases radiated from ground antenna array 40 are as desired. When deviations are found, change instructions are issued to the signal generator. If signals cannot be maintained within prescribed tolerances, the monitor can place an out-of-tolerance message in the data stream. Of course, it can be appreciated that monitor receiver 44 is not necessary to an embodiment of this invention.

Figure 7:
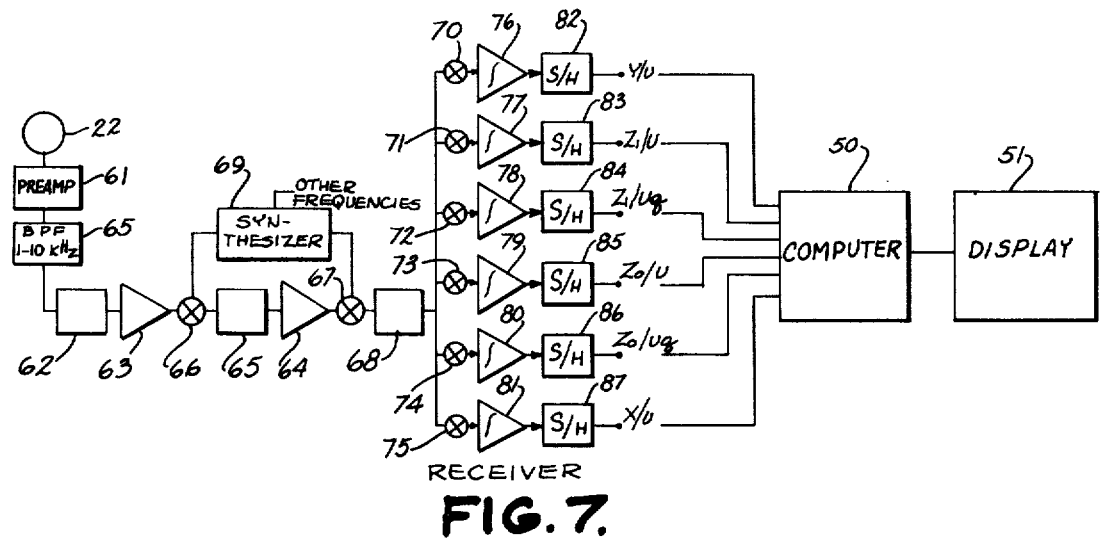
FIG. 7 is a block diagram of a portion of the receiver in accordance with an embodiment of this invention.

Airborne components 20 of landing aid system 10 for a frequency division multiplexing embodiment are shown in FIG. 1 and having a separate signal processing path for each of the signals from receiving loop antennas 22, 23 and 24. Although there is additional discussion below of various multiplexing alternatives, it can readily be appreciated that if time division multiplexing were used, a single path could be switched among antennas 22, 23 and 24. FIG. 7 shows a more detailed block diagram of a signal path, in particular the U antenna signal path.

For practical reasons, amplifier group 52 and frequency translator group 53 are broken into several components and spread throughout the signal path. More specifically, U amplifier 25 of amplifier group 52 includes a preamplifier 61, gain control 62, amplifier clipper 63 and amplifier clipper 64. Frequency translator 55 of frequency translator group 53 includes band pass filter 65, mixer 66, mixer 67, low pass filter 68 and synthesizer 69. Accordingly, receiving loop antenna 22 is sequentially coupled to preamplifier 61, band pass filter 65, gain control 62, amplifier clipper 63, mixer 66, band pass filter 65, amplifier clipper 64, mixer 67 and low pass filter 68. Synthesizer 69 is connected to mixers 66 and 67. The output of low pass filter 68 is connected to signal processor 58.

Signal processor 58 includes parallel combinations of the sequential connection of a mixer, an integrator and a sample-and-hold block. More specifically, each of the parallel paths has a mixer 71 through 75, integrators 76 through 81 and sample-and-hold blocks 82 through 87. The outputs from sample-and-hold blocks 82 through 87 are coupled to computer 50 and in turn coupled to display 51. In this embodiment, there are six parallel paths for processing the signal from the U antenna. There is one path for signals received from the Y transmitting antenna received by the U receiving antenna, denoted Y/U. Similarly, there is one path for signals received from the X transmitting antenna received by the U receiving antenna, denoted X/U. The transmitted signal from Z antenna has two frequencies for carrying a binary code and requires two paths, denoted $Z_1/U$ and $Z_0/U$. Further, during acquisition two additional signals are processed so data transmitted by the Z antenna is not lost. These signals paths are denoted $Z_1/Uq$ and $Z_0/Uq$ and have negligible output when the receiver is locked on the transmitted frequencies.

The metal aircraft upon which receiving antenna array 21 is mounted causes some distortion of the magnetic fields received by the antenna. Unless the aircraft is very close to the transmitter, this distortion may be described by a linear transformation which maps the free space fields into three antennas 22, 23 and 24. For example, a field aligned exactly with the length of the aircraft will also appear in the transverse and vertical receiving antennas. This effect is constant for a given aircraft and installation. It is easily corrected by applying an inverse linear transformation to the measured data.

The input bandwidth of amplifier group 52 is advantageously restricted to the 1 to 10 kHz band, after which the signals are boosted to a suitable level and noise impulses are clipped. Accurate gain control is used to obtain maximum effectiveness in clipping the VLF-ULF noise. Alternatively, an impulse detector may be applied at this point to shut off amplifier 25 when an impulse occurs. The signal is now translated upward to a convenient intermediate frequency such as 455 kHz. The bandwidth is first reduced to 1 kHz and then to 100 Hz, with clipping each reduction. After the final amplification and clipping, the signal is translated downward to approximately 1 kHz for final processing.

The mixing frequencies required to accomplish the necessary frequency translation are synthesized by standard techniques. The first mixing frequency is selectable in 10 Hz steps from 456 to 460 kHz. This allows any selected signal in the 1 to 10 kHz band to be translated to 455 kHz. The second mixing frequency of 456 kHz is fixed and translates the 455 kHz intermediate frequency to the 1 kHz processing frequency. For initial acquisition, these frequencies are synthesized from a stable reference oscillator. After acquisition, they can be locked to the received signal to remove any frequency error.

Signal processor group 54 must acquire the received signals, establish the timing reference, make measurements for position/orientation computations, and decode transmitted data. To do this, it uses a series of phase-locked loops, frequency dividers, and integrators. Interface with computer 50 is accomplished by an A/D converter and a suitable buffer. Signal acquisition is accomplished by the equivalent of a pair of phase-locked loops. In this particular example, as stated, frequency multiplexing is used and data is carried only by one radiating antenna (the Z signal shown in FIG. 6). The frequencies for carrying data, i.e. ones and zeros, on the Z signal are referred to as the mark and space frequencies. Accordingly, the phase-locked loops can operate at, for example 1000 and 1010 Hz, to correspond to the mark and space frequencies of the Z signal. Loop bandwidth may be changed for initial acquisitions and later tracking, but in either case, it will be sufficiently low to cause the loop to ignore the effects of the frequency shift keying. The 10 Hz reference timing is obtained as the difference between the frequencies of the two oscillators generating the mark and space frequencies. Actual implementation can use measurements of both the sine and cosine integrals for measurement and locking, respectively.

Signal measurements are made by mixing a received signal with a locally generated signal and integrating the product. A coherent set of mixing frequencies (for example, 1020, 1010, 1000, and 990 Hz) corresponding to the four transmitting frequencies is synthesized from the 10 Hz reference frequency. The Integrators 76–81 are advantageously reset about every 0.1 second by the reference signal. The value in each of the integrators is transferred to sample-and-hold circuits 82–87 just prior to the resetting of integrators 76–81.

Decoding of the data and averaging of the measurements is accomplished by software. Computer 50 can measure signal amplitude and signal-to-noise ratio on a sample-by-sample basis. Navigation measurements of the X and Y signals are accomplished simply by summing an appropriate number of 0.1 second samples. A similar procedure is used on the Z channel for initial acquisition. When measurements indicate a satisfactory signal-to-noise ratio, data may be extracted by comparing the Z-mark samples to the Z-space samples. Z-navigation information is based on an average of those samples corresponding to the data received. That is, only the Z-mark or Z-space sample at a given sampling point is used, depending on the decision about which carrier was transmitted during that interval.

The antenna, preamplifier, computer and display can be common to both landing aid system 10 and Loran-C, omega or VLF navigation systems. This is particularly advantageous for reducing cost and for simplification of equipment. Further, an aircraft may use Loran-C or omega to navigate to within a few kilometers of the landing point and then acquire landing aid system 10 signals and use them for final approach guidance. The computer and display can be anything suitable and are therefore not discussed here in detail. Further, in some applications, such as miner location, it is advantageous to couple receiving antenna array 21 to amplifier group 52 and subsequent component by a radio line and place such components at a surface location so they do not have to be carried about by the miner.

OPERATION

Geometrical considerations dictate the need for inclusion of a timing reference in the transmitted signal. They also require airborne components 20 to measure the signal components induced in each receiving antenna 22, 23 and 24 by each transmitting antenna 41, 42 and 43. These requirements and any additionally desired data transmission form the constraints on signal format. While any choices are possible, coherent frequency division multiplex/frequency shift keying is advantageous for many general purpose users.

Figure 3:
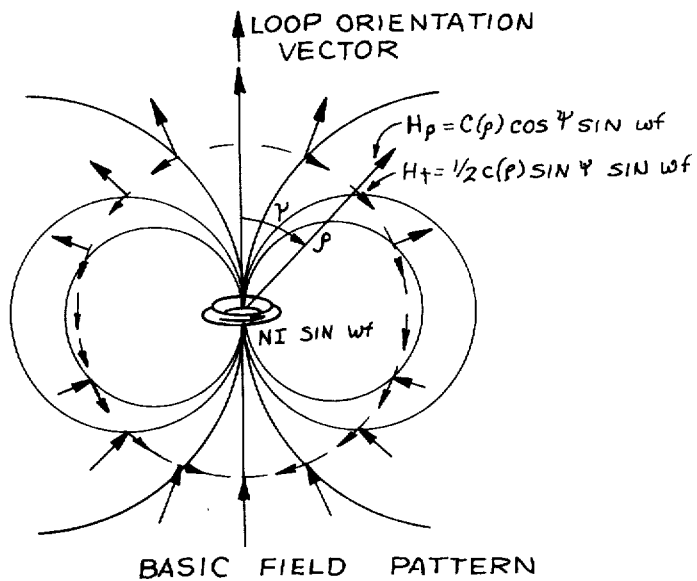
FIG. 3 is a simplified representation of a magnetic field associated with a current carrying closed loop.

Near-field equations may be decomposed into a few relatively simple terms. The use of a suitable multiplexing format allows separate measurements to be made on the signals as received by each of three receiving antennas 22, 23 and 24. The near-field produced by a circular loop antenna can be described in terms of radial and tangential components, as shown in FIG. 3. Although the antennas need not be circular they should advantageously appear as magnetic dipoles. All of the effects of distance are contained in a separable factor $$C(\rho) = (NIa^2/2\rho^3) = (M/\rho^3) \tag{1}$$

where $N$ is the number of turns, $I$ is the current in amperes, $a$ is the radius of the loop in meters, $\rho$ is the distance from the center of the loop in meters, and $M$ is the magnetic moment or strength of the transmitter and antenna. This formula is accurate except at distances of less than one or two loop radii. The radial and tangential components may now be represented by $$H_r = C(\rho) \cos \Psi \sin \omega t \tag{2}$$

and $$H_t = \tfrac{1}{2} C(\rho) \sin \Psi \sin \omega t \tag{3}$$

where the current in the loop is NI sin $\omega t$. The near-field is thus seen to change in both amplitude and orientation with changes in the orientation angle $\Psi$. Note that in reception, a loop antenna responds only to the field component aligned with the loop orientation vector (i.e., perpendicular to the plane of the loop).

Figure 4:
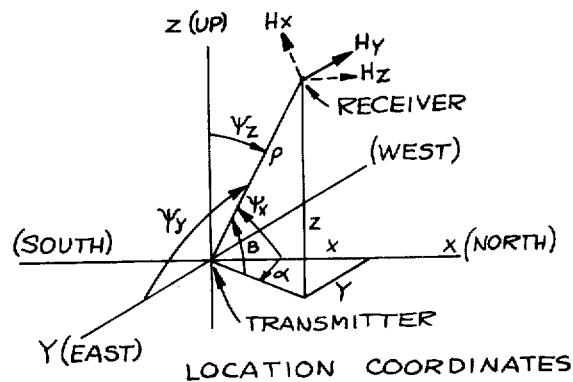
FIG. 4 is a graphical representation of the location coordinate system of the remote object with respect to the location of the origin of the reference coordinate frame.

A coordinate system for determination of the position of the receiver relative to the transmitter is shown in FIG. 4. The X, Y and Z axes are aligned with north, east, and vertical, respectively, and are centered at the center of transmitting ground antenna array 40. Location of receiving antenna array 21 may be specified in either rectangular coordinates $(x, y, z)$ or in polar coordinates as a $(\rho, \alpha, \beta)$. It may also be specified by the distance $\rho$ and two of the three orientation angles $\Psi_X$, $\Psi_Y$, or $\Psi_Z$.

Measurement of the three transmitted signals from ground antenna array 40 as received by the set of three orthogonal receiving antennas 22, 23 and 24 produces nine parameters which are sufficient to determine the six position and orientation parameters. As noted earlier this assumes one orientation or position parameter is independently determined. While there are a variety of computational algorithms that can be used, it is conceptually easiest to being by using relative amplitudes to determine position. First, note that the sine and cosine of an orientation angle $\Psi_X$, $\Psi_Y$, or $\Psi_Z$ can be written in terms of the rectangular coordinates $x, y$, and $z$, normalized by distance $\rho$. For example, $$\cos \Psi_Z = z/\rho \quad (4)$$

and $$\sin \Psi_Z = \sqrt{x^2 + y^2}/\rho \quad (5)$$

The signal power produced by the Z antenna (i.e. the energy stored in the near-field) at the specified location is given by $$P_Z = \tfrac{1}{4}C^2(\rho)(\tfrac{1}{4}\sin^2\Psi_Z + \cos^2\Psi_Z) \quad (6)$$

$$= \tfrac{1}{4}C^2(\rho)[\tfrac{1}{4}(x/\rho)^2 + \tfrac{1}{4}(y/\rho)^2 + (z/\rho)^2] \quad (7)$$

Similarly, $$P_X = \tfrac{1}{4}C^2(\rho)[(x/\rho)^2 + \tfrac{1}{4}(y/\rho)^2 + \tfrac{1}{4}(z/\rho)^2] \quad (8)$$

and $$P_Y = \tfrac{1}{4}C^2(\rho)[\tfrac{1}{4}(x/\rho)^2 + (y/\rho)^2 + \tfrac{1}{4}(z/\rho)^2] \quad (9)$$

The power measurements are thus related directly to a system of three equations with three unknowns. The solution of these simultaneous equations produces the squared normalized rectangular coordinates which are converted to the absolute values of the normalized rectangular coordinates.

The received power corresponding to a given transmitting antenna is distributed among all three receiving antennas. Thus, for example, $P_Z$ is obtained from $$P_Z = P_{Z/U} + P_{Z/V} + P_{Z/W} \quad (10)$$

where the three quantities on the right represent the power measurement from each of the three receiving antennas.

The data impressed upon the transmitted signal can advantageously include the strength of the transmitter, i.e. its magnetic moment M. Alternatively, independent means such as written tables or other radio communication, can be used to determine the strength of the transmitted field. The remaining position variable is the distance $\rho$, which is now obtained by substituting values of the magnetic moment and the normalized absolute distances into (7), (8), or (9), or a combination thereof. The use of signal strength as a measure of distance is quite accurate, since the rapid decrease in signal level with distance converts large noise-produced errors into relatively small distance errors.

While the magnitudes of the rectangular coordinates are now known, their signs are not known, and there are thus eight mathematically possible locations. These ambiguities are easily resolved by comparing the signs of the received signal vectors, or equivalently the crossing angles among them; a variety of algorithms are possible. One approach is to mathematically determine dot products of the three received signal vectors; these are invariant with receiver orientation. Comparison of the polarities of the dot products conveniently divides space into eight segments, thus resolving the position ambiguities.

Figure 5:
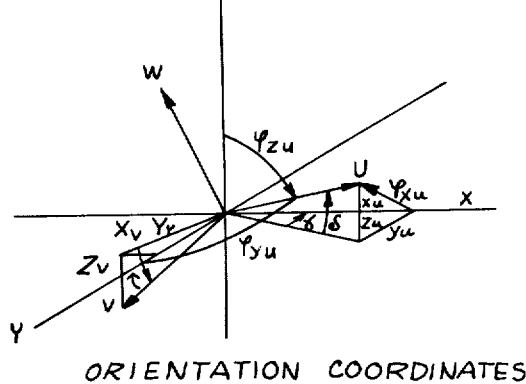
FIG. 5 is a graphical representation of the orientation coordinate system of the remote object with respect to the reference coordinate frame.

A system of coordinates for specification of the receiver's orientation is shown in FIG. 5. The coordinate axes designated U, V, and W correspond to those internal to the aircraft and may be thought of as forward, right, and upward. Their orientation relative to the XYZ axes of the transmitter is determined by a set of three angles $\tau$, $\delta$, and $\gamma$, or roll, pitch, and yaw (not to be confused with the transmitter orientation angles $\Psi_X$, $\Psi_Y$, and $\Psi_Z$). Alternatively, orientation may be described in terms of a set of normalized distance vectors, as shown.

The signals from the three transmitting antennas form a triad of vectors at the location of the receiver. The orientation of these vectors is a function of position and may be calculated from the position just determined. While these three vectors are usually not orthogonal, they do span three-dimensional space.

The relationship (as a function of orientation) of nine received signals to the X, Y and Z signals at that point in space can be described in terms of three matrix equations, each employing the same three simple rotations. Known values are the predicted X, Y and Z signals and the measured U, V and W fields. Solution of this equation produces the orientation angles $\tau$, $\delta$, and $\gamma$. Although the relationships are non-linear, the equation can be solved rapidly through iterative/incremental techniques.

If the previously mentioned one position or orientation parameter is not independently supplied, there is one unresolvable ambiguity in position/orientation estimates. For example, the system is unable to distinguish a receiver to the northeast of the transmitter at 30° elevation and in an upright position from a receiver southwest of the transmitter, 30° below ground, and in an upsidedown orientation. However, as also mentioned, if landing aid system 10 is supplied with the information that the airplane is right side up this ambiguity is eliminated.

The signal format used by the transmitter must be designed to allow the user to determine his position and orientation. The geometric computations discussed in the previous section establish some informational parameters which are advantageously met by the format. First, it must allow airborne components 20 to determine the amplitude of the signal induced in a given receiving antenna (22, 23 or 24) by each transmitting antenna (41, 42 or 43). Secondly, it advantageously provides one-way data transmission capability so airbourne components 20 will know the magnetic moment, (i.e. strengths), of the transmitted signal. Thirdly, to facilitate communication of both of the previous information parameters, the signal must include a timing reference, and all signal components should advantageously be coherent with this reference. The timing signal is used to characterize the polarity of the transmitted signal. If this timing signal is omited, there is an increase in the ambiguity as to position and orientation of the remote object. Of course, independent information sources may be used to remove this ambiguity. For example, navigation aids may be used to determine the quadrant (i.e. northeast, southeast, northwest or southwest) fo the remote object with respect to the radiating means; altimeters may be used to determine the relative height of the remote object with respect to the radiating means, which may be located at the top of the hill.

There are endless varieties of formats which can meet the above requirements. However, it is additionally desirable that the signal format allow easy acquisition by the user as he approaches the landing point. Simplicity in the receiver is also quite desirable. Four possibilities for transmitted signal format are:

1. FREQUENCY DIVISION MULTIPLEXING (FDM)

In this format, each transmitting antenna in the array is assigned a particular, different frequency. Measurements of the information parameters can be simply the outputs of integrators corresponding to the three frequencies. The carriers are of constant phase and therefore easily acquired by a phase-locked loop with an appropriate time constant.

2. TIME DIVISION MULTIPLEXING (TDM)

In TDM, only one loop of ground antenna array 40 is excited at a time. Simplification of transmitter and receiver is possible because circuits can be time-shared. However, data transmission is more complex, and moving aircraft must interpolate between measurements to provide the equivalent of simultaneous measurements. This is advantageous mode of multiplexing for the location of a relatively slow moving or trapped miner below ground.

3. PHASE DIVISION MULTIPLEXING (nutation)

Proper excitation of the three loops will produce the equivalent of physical nutation of a single loop antenna. This may be accomplished by excitation of the Z loop with an unmodulated carrier and the X and Y loops by carriers with low-frequency amplitude modulation by sine and cosine waves, respectively. While this results in a beacon-like signal, that property is not actually utilized in the position and orientation calculations. What is utilized is that the radiated electromagnetic field from each of ground loop antennas 40 can be identified by either an unmodulated carrier or a phase difference between the modulation envelope of two modulated carriers. If a nutating field is used there is no requirement that the axis of nutation be positioned along a line between the radiating and the receiving antennas. The position and orientation of the remote object can be determined regardless of the orientation of the axis of nutation.

4. SPREAD SPECTRUM MULTIPLEXING

To accomplish spread spectrum multiplexing, each transmitted signal is assigned a unique code sequence which shifts carrier frequency, carrier phase (or both). Reception is accomplished by using identical code sequences to remove the modulation. The codes assigned to the three antennas are designed not to cross correlate and thus make possible measurement of individual signals. However, acquisition is typically more difficult, both because of the absence of a carrier component and because the code timing must be acquired, in addition to the carrier. While this offers additional security and immunity to jamming, these properties are already somewhat inherent in a low-frequency near-field signal.

While different formats may be preferred for different specialized applications, a frequency division multiplexing format will be advantageous to many general purpose users. Measurements may be made simultaneously and continuously, and carriers will be available to aid in acquisition by an approaching aircraft. Data may be impressed on the carriers by coherent frequency shift keying. The field strength varies only 6 dB with orientation of receiving loop antennas 41, 42 and 43 thus permitting data to be applied to only one or to all three signals. Using the same data on all carriers can be used to reduce bit error rate, and using different data on the carriers in the form of an eight level code could triple the transmission rate.

Figure 6:
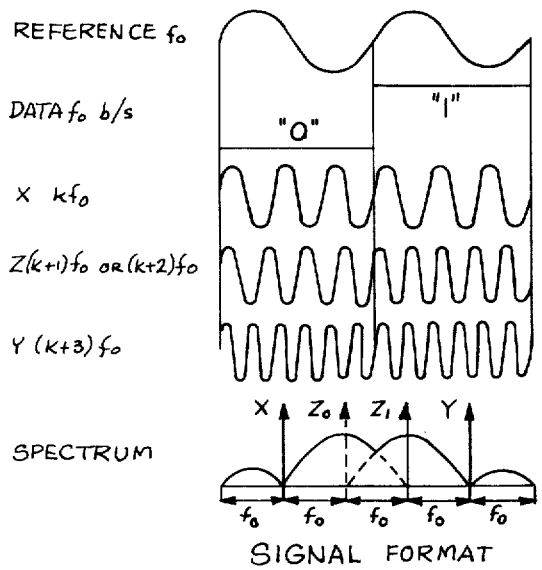
FIG. 6 is a graphical representation of the amplitude of the signals with respect to time of the electromagnetic fields.

The first step in establishing the system design is to decide the relationships among the mark and space frequencies and signals transmitted from the X, Y, and Z antennas. As an example, only modulation of the Z signal is used so that four different frequencies are required. Since the power spectrum of random data has zeros at integral multiples of the data rate, it will be desirable to separate the X and Y signals from the Z mark and space frequencies by the data frequency $f_o$, as shown in FIG. 6. The data modulation thus will not degrade the position/orientation performance of the system.

The next parameter which must be established is the data rate $f_o$. The data rate itself is relatively uncritical, since the data are for the most part, fixed. The transmitting antenna typically restricts the bandwidth to one percent of the carrier frequency. Operation at 1 kHz would thus limit the data rate to about 10 bits per second (b/s). A further consideration is interference from harmonics of power system frequencies (50, 60, and 400 Hz). A data rate of 10 b/s allows all four carrier frequencies and essentially all of the modulation energy to fall between two adjacent 60 Hz harmonics.

The third step in the system design is the selection of the range of carrier frequencies. The generation of a far-field component can only result in inaccuracies in the position and orientation estimates, so it is desirable to use as low a frequency as possible. The use of frequencies below 10 kHz virtually eliminates the far-field interference. Operation below 1 kHz will make data transmission more difficult and subject the receiver to larger amplitude harmonics from power systems and larger atmospheric noise levels. The range of 1 to 10 kHz is therefore advantageous for many users.

Atmospheric noise fields in the 10 – 14 kHz range are typically no worse than 20 u V/m, which is roughly equivalent to a magnetic field of 0.05 uA/m (measured in a 1 Hz bandwidth). An examination of curves for the 1 to 10 kHz range shows that while atmospheric noise at 1 kHz is about the same as it is at 10 kHz, there is generally a 10 dB lower noise level in the 3 to 4 kHz range. This null is the result of the high attenuation rate of the earth-ionosphere waveguide at these frequencies. Additional range and accuracy may therefore be obtained by operating in the 3 to 4 kHz range. Further, horizontally polarized waves having a vertical magnetic field are subject to considerably more attenuation than vertically polarized waves. As a result, atmospheric noise aligned with the Z signal should be somewhat less than the above values and offers another advantage for placing the data on the Z signal.

Atmospheric noise in the VLF—ULF region results from lightning discharges and is therefore impulsive, rather than guassian. Much power line noise is also impulsive, since it results from periodic current surges, although these impulses are considerably wider than lightning generated impulses. The receiver can use this impulsive nature to obtain 15 to 20 dB of noise reduction by clipping the impulses to an amplitude only slightly larger than that of the signal. Editing or noise blanking can obtain even greater reductions in noise level.

Signal-to-noise ratios for four typical operating conditions are shown in Table 1.

Table 1.

| Link Calculations. | |
|---|---|
| Basic Parameters | |
| Noise at 1 or 10 kHz, B = 1 Hz | 0.05 μA/m |
| Transmitter magnetic moment | 400 A·m$^2$ |
| Magnetic field at 1 km | 0.4 μA/m |
| Basic SNR, navigation (B = 1 Hz) | +18 dB |
| Basic SNR, data (B = 20 Hz) | + 5 dB |

Table 1.-continued
Link Calculations.

| Basic Effects | |
|---|---|
| Editing/clipping | +20 dB |
| Transmitter antenna orientation | − 6 dB |
| Net effect | +14 dB |
| Example 1: $\rho = 1$ km, f = or 10 kHz | |
| Basic SNR + basic effects | |
| SNR, data | +19 dB |
| SNR, navigation | +32 dB |
| Example 2: $\rho =$ km, f = 3 to 4 kHz | |
| Distance increase for example 1 | −18 dB |
| Noise null | +10 dB |
| SNR, data | +11 dB |
| SNR, navigation | +24 dB |
| Example 3: $\rho = 3.17$ km, f = 3 to 4 kHz | |
| Distance increse from example 2 | −12 dB |
| SNR, data | − 1 dB |
| Penalty for not decoding data | − 3 dB |
| SNR, navigation, B = 1 Hz | + 9 dB |
| 10 Second integration | +10 dB |
| SNR, navigation, B = 0.1 Hz | +19 dB |
| Example 4: $\rho = 4$ km, f = 3 to 4 kHz | |
| Distance increase from example 3 | − 6 dB |
| SNR, data | − 7 dB |
| SNR, navigation | +13 dB |

A transmitter moment of 400 A.m² produces a field of 0.4 μA/m at a distance of 1 km. Since navigation (position and orientation) estimates can be based on a one second averaging of measurements, their effective bandwidth is 1 Hz, and their basic signal-to-noise ratio if + 18 dB. Data decoding necessitates a bandwidth of about 20 Hz, hence a 13 dB penalty relative to navigation estimates, and thus a +5 dB basic signal-to-noise ratio.

However, two effects must also be considered. First, about 20 dB of noise reduction can be obtained by clipping or editing of impulsive noise. Secondly, the field strength attributable to a given transmitting antenna varies with the receiver orientation relative to that antenna, and can thus introduce up to a 6 dB reduction in signal amplitude. There is no loss due to receiver orientation, since the outputs from all three receiving antennas (22, 23 and 24) are mathematically combined to derive the total signal vectors. The results of these two effects are signal-to-noise ratios at a 1 km distance of +32 dB for navigation and + 19 dB for data. These correspond to a 1° rms angular error and a negligible bit-error-rate.

The second example in Table 1 is for operation in the 3 to 4 kHz frequency range at a distance of 2 km. While doubling the distance decreases the signal strength by 18 dB, operating in the atmospheric noise null and band results in a 10 dB decrease in the noise power. Consequently, the navigation and data signal-to-noise ratios are +24 and +11 dB, respectively. These are equivalent to 2.6° rms angular errors and a 10⁻⁴ bit-error-rate.

In the third example in Table 1, the range is increased to 3.17 km, resulting in a 12 dB decrease in signal amplitude from its level at 2 km. As a result, the data signal-to-noise ratio drops to −1 dB, making the data essentially undecodable. Since the Z signal cannot be identified as either a mark or space frequency, the measurements on the two frequencies must be averaged, resulting in a 3 dB increase in received noise power. The resultant +9 dB navigation SNR is equivalent to 14° rms error. However, at this distance, changes in distance the relative orientation should occur relatively slowly, allowing the integration time to be increased to 10 seconds. This 10 dB increase in SNR reduces the rms measurement error to 4.5°.

The last example in Table 1 describes performance at the design range of 4 km. Signal strength decreases by 7 dB from that of the third example, resulting in a 13 dB signal to noise ratio for navigation, or a 90° rms error. This example typifies initial acquisition of the landing aid signals by an approaching aircraft.

One landing aid system can cover an entire airfield. However, itis possible to use a singlehigh-power system in the vicinity of a set of landing pads, and separate low-power systems in each landing pad. This would provide both long range capability and very precise zero-visibility pinpoint landing capabilities. As already mentioned, the use of low-frequency near-fields will reduce jamming and interference problems. In the example design described above, increasing the distance to 8 km would reduce the signal strength to −5 dB, requiring about 100 seconds of integration to detect the presence of a signal. Radiation of significant far-field jamming signals requires a high-power transmitter and a relatively large antenna. In addition, operation in the 3 to 4 kHz range makes far-field signals subject to high attenuation rates. A near-field signal produced by similar equipment must be located at a similar range to be of similar amplitude to the landing aid signal. Suppose, for example, that two landing aids were operating on the same frequency, and produced equal fields at the midpoint between them. As the receiver moved to half the distance from the desired landing aid, it signal would increase by 18 dB, while that of the interfering landing aid would decrease by 18 dB. The resulting 36 dB relative change would reduce interference to a negligible level. The use of a low-frequency system also provides continuous coverage at all elevations and in all directions, making it more useful for VTOL operations. The system also provides coverage of the surface and may be used for taxiway guidance. The difference in the permeability and dielectric constants of the ground and the air will cause a distortion of the shape of the magnetic field. In most cases, inclusion of simple modifying terms based on conductivity and slope of the ground should suffice.

It should also be noted that a landing aid system can be useful in two dimensional maneuvering such as taxiing on an airport runway. Indeed, if all maneuvering is to be done in two dimensions and the only orientation component of interest is heading, such as would be the case in docking a ship, then only two orthogonal radiating means and two orthogonal receiving means need be used. Additionally, in either the two dimensional case or the three dimensional, independent outside inputs to the system can be used to remove ambiguity. For example, the use of an independent navigating system can be used to determine the quadrant in which the vehicles is approaching the radiating means.

Various modifications and variations will no doubt occur to those skilled in the various arts to which this invention pertains. As discussed above, the signal format may be chosen from any of numerous alternatives. Additionally, the particular parameters of the transmitting and receiving apparatus will depend upon the particular application. Systems for either longer or shorter ranges can be designed by appropriate choices of parameters. These and all other variations which basically rely on the teachings through which this disclosure has advanced the art are properly considered within the scope of this invention as defined by the appended claims.

The embodiments of the invention in which an exclusive property or privilege is claimed are defined as follows:

1. Apparatus for determining position coordinate of an object, constrained to move in a plane, relative to a reference coordinate frame and remote from said reference coordinate frame comprising:

two radiating means having orthogonal components centered about the origin of said reference coordinate frame:

means for applying to said two radiating means electrical signals which are multiplexed with respect to one another for producing two electromagnetic fields radiated in response to said electrical signals, said two electromagnetic fields being distinguishable from one another and containing information characterizing the polarity of the electromagnetic radiation;

two receiving means having orthogonal components for detecting and measuring the spatial components of said electromagnetic fields; and analyzing means coupled to said receiving means for converting said electromagnetic field components into remote object position coordinates relative to said reference coordinate frame, said analyzing means operating open loop with respect to said radiating means and including computation means for determining the separation distance between said radiating means and said receiving means by comparing the total transmitted magnetic moment to the total received magnetic moment.

2. Apparatus as recited in claim 1 wherein said analyzing means further includes means for converting said electromagnetic field components and remote object position coordinates into at least one remote object orientation component relative to said reference coordinate frame.

3. Apparatus as recited in claim 1 wherein said analyzing means convert said electromagnetic field components into remote object position relative to said reference coordinate frame with at most one ambiguous combination of orientation and position.

4. Apparatus as recited in claim 2 wherein said analyzing means convert said electromagnetic field components into remote object position and orientation relative to said reference coordinate frame with at most one ambiguous combination of orientation and position.

5. Apparatus for determining the position of a remote object relative to a reference coordinate frame comprising:

three radiating means having orthogonal components centered about the origin of said reference coordinate frame;

means for applying to said three radiating means electrical signals which are multiplexed with respect to one another and, additionally, carry information for characterizing the polarity of said three electromagnetic fields radiated in response to said electrical signals, said three electromagnetic fields being distinguishable from one another;

three receiving means having orthogonal components for detecting and measuring the spatial components of said electromagnetic fields; and analyzing means coupled to said receiving means for converting said electromagnetic field components into remote object position relative to said reference coordinate frame with at most one ambiguous combination of orientation and position, said analyzing means operating open loop with respect to said radiating means and including computation means for determining the separation distance between said radiating means and said receiving means by comparing the total transmitted magnetic moment to the total received magnetic moment.

6. Apparatus as recited in claim 5 wherein said analyzing means further includes means for converting said electromagnetic field components and remote object position into remote object orientation relative to said reference coordinate frame with at most one ambiguous combination of orientation and position.

7. Apparatus as recited in claim 6 wherein said analyzing means are physically remote from said receiving means and are coupled by electromagnetic radiation.

8. Apparatus as recited in claim 7 wherein said detected and measured spatial components of said electromagnetic fields have substantially greater nearfield components than far-field components and wherein said electromagnetic fields have a frequency sufficiently low to substantially reduce interference by surrounding objects to the free-space characteristics of said electromagnetic fields.

9. Apparatus for determining the position and orientation of an object relative to a reference coordinate frame comprising:

three radiating means having orthogonal components located at the origin of said reference coordinate frame for radiating an electromagnetic field;

means for applying to said radiating means electrical signals which differ from one another thereby creating electromagnetic fields associated with each of said radiating means, said electrical signals including spatial component data characterizing the magnetic moment and polarity of said electromagnetic fields;

means for detecting and measuring the spatial components of said electromgnetic fields; and means for converting said electromagnetic field components into object position and orientation relative to said reference coordinate frame, said means for converting operating open loop with respect to said radiating means.

10. Apparatus as recited in claim 9 wherein said three radiating means are three closed, current-carrying circular loop antennas.

11. Apparatus as recited in claim 10 wherein the difference between said electrical signals is selected from a group including time, frequency, phase and spread spectrum multiplexing.

12. Apparatus as recited in claim 11 wherein said detecting and measuring means comprises three orthogonal receiving means located at said object.

13. Apparatus as recited in claim 12 wherein said electrical signals are sinusoidal.

14. Apparatus as recited in claim 13 wherein said three orthogonal receiving means are three closed, current-carrying circular loop antennas fixedly mounted to said object.

15. Apparatus as recited in claim 14 wherein said spatial components include nine characteristic signals, each said three receiving antennas having a characteristic signal associated with each of said three radiating antennas.

16. Apparatus as recited in claim 15 wherein said converting means includes:

means for determining the total magnetic moment radiated from said radiating means;

means for determining the total magnetic moment received by said receiving means; and means for determining the distance of said object from said reference coordinate frame by comparing said total magnetic moment radiated to said total magnetic moment received.

17. Apparatus as recited in claim 16 further comprising a monitor station at a fixed location spaced from said radiating means having receiving means for detecting said radiated electromagnetic field and being coupled to said transmitting means for providing feedback to said transmitting means characterizing said transmitted field.

18. Apparatus as recited in claim 17 wherein said electrical signal further include information selected from the group of transmitter identification, electromagnetic field distortion corrections, locations of obstacles, location of a landing site relative to said radiating means and wind direction.

19. Apparatus as recited in claim 18 wherein said sinusoidal electrical signals have a frequency from about 1 kHz to about 10 kHz and the separation distance from said remote object to said radiating means is limited so said electromagnetic field has a near-field component substantially in excess of a far-field component.

20. Apparatus for determining the position and orientation of an object with respect to a reference coordinate frame comprising:

three orthogonal, conductive loop radiating means located at the origin of said reference coordinate frame for radiating an electromagnetic field;

means for applying to said radiating means three sinusoidal, coherent, frequency multiplexed electrical signals which differ from one another thereby creating distinguishable electromagnetic fields associated with each of said radiating means, said electrical signals including data characterizing the magnetic moment and phase of said electromagnetic fields;

three orthogonal, conductive loop receiving means mounted to said object for detecting and measuring the spatial components of said electromagnetic fields, said spatial components including nine characteristic signals, each of said three receiving means having a characterisitc signal associated with each of said three radiating means; and means for converting said electromagnetic field components into object position and orientation relative to said reference coordinate frame, said converting means operating open loop with respect to said radiating means including means for determining the total magnetic moment radiated from said radiating means, means for determining the total magnetic moment received by said receiving means, and means for determining the distance of said object from said radiating means by comparing said total magnetic moment radiated to said total magnetic moment received, said distance being limited so said electromagnetic field has a near-field component substantially greater than a far-field component of said electromagnetic field.

21. Apparatus as recited in claim 20 wherein said converting means includes the coupling of an amplifier means, a frequency translator means and a signal processor means, said signal processor means including integration means for integrating with respect to time the transmitted signal received at each of said receiving means from each of said radiating means.

22. Apparatus for determining the orientation of an object relative to a reference coordinate frame comprising:

three radiating means having orthogonal components located at the origin of said reference coordinate frame for radiating an electromagnetic field;

means for applying to said radiating means electrical signals which differ from one another thereby creating electromagnetic fields associated with each of said radiating means, said electrical signals including spatial component data characterizing the magnetic moment and polarity of said electromagnetic fields;

means for detecting and measuring the spatial components of said electromagnetic fields; and means for converting said electromagnetic field components into object orientation relative to said reference coordinate frame, said means for converting operating open loop with respect to said radiating means.

* * * * *